United States Patent Office 2,894,025
Patented July 7, 1959

2,894,025
GAMMA-(3-AMINOCYCLOHEXYL) BUTYRIC ACID AND ESTERS

Arthur William Anderson and Warren John Brehm, Wilmington, Del., assignors to E. I. du Pont de Nemours and Company, Wilmington, Del., a corporation of Delaware No Drawing. Application September 7, 1955
Serial No. 533,011

2 Claims. (Cl. 260—514)

This invention relates to a process for the preparation of an aminoacid and its derivatives, to a linear polyamide made therefrom, and to processes for their preparation. The invention is more particularly directed to the manufacture of a linear polyamide characterized by properties having a high softening point and excellent thermostability.

Since the early fundamental research of Wallace H. Carothers and the issuance of his basic patents on condensation products from the diamines and dibasic acids and their subsequent polymerization, many studies have been made to produce resins having properties superior to those of the nylons already described in the literature, and to produce such polymers more cheaply. Caprolactam and other bifunctional compounds containing both amino and carboxyl groups have been studied. The instant invention concerns the last mentioned types of compounds, their preparation and their polymerization.

Inventa A.-G. fuer Forschung und Patentverwertung, in their Swiss Patent 276,924 of 1951, describe the preparation of resins from bicyclooctanoneoxime. The complicated and expensive process of the patent produces polymers having comparatively high melting points but the expense of their preparation, the brittleness of the polymers and the difficulty of fabricating the polymers into useful articles, markedly reduce the utility of such resins. The polymers of the patent contain this unit structure:

1. 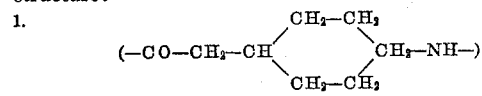

The process of the instant application is directed to the preparation of a linear polyamide characterized principally by high softening point, good toughness, excellent thermal stability, and low melt viscosity at molding temperatures. Moreover, this superior polyamide is produced by a process which is much more economical than processes used for preparing resins having commensurate physical properties.

An object of the present invention is to provide a process for the preparation of a new polyamide together with intermediates for its preparation. A further object is to provide an aminoacid that can be homopolymerized to give orientable resins having excellent thermostability and low melt viscosity at molding temperatures. Yet another object is to provide an economical process for the preparation of the aforesaid intermediates and of the monomeric and polymeric compounds derived therefrom.

In accord with the invention, a linear polyamide of high softening point and excellent thermostability is obtained from a monomer having this structure:

2. 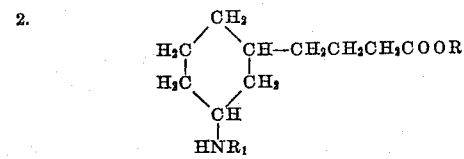

in which R is hydrogen, ammonium, substituted ammonium, aliphatic or a cycloaliphatic group, and $R_1$ is hydrogen or an alkyl. The aminoacid, gamma-(3-aminocyclohexyl)butyric acid, may be produced by a series of reactions illustrated by these equations:

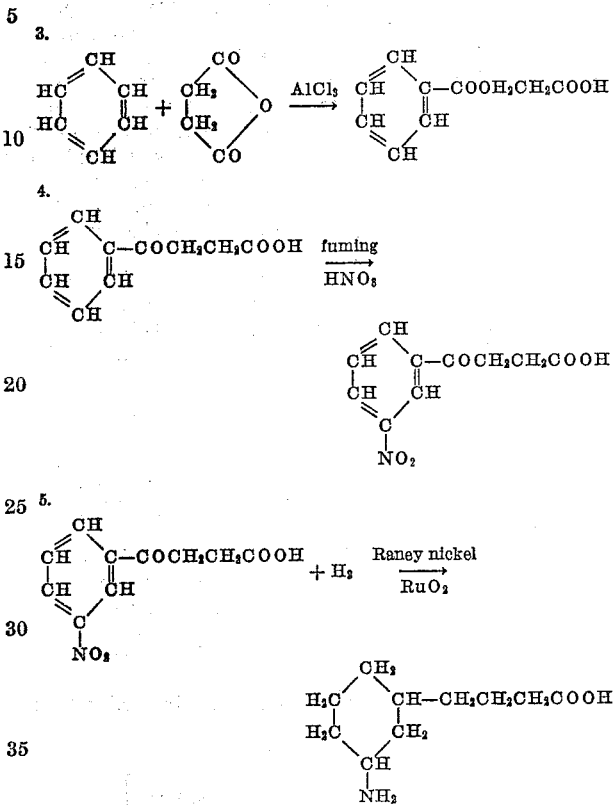

Reaction 3 may be conducted in accord with the well known processes of the art such as that described in "Organic Synthesis," Coll., vol. II, p. 81. Reaction 4 may be conducted in accord with a customary nitration process such, for example, as those described in the Amblard et al. U.S. Patent 2,439,513. Reaction 5 is a catalytic hydrogenation reaction such as shown in the prior art with the exception that the nitrated derivative is first hydrogenated in a suitable solvent in the presence of a Raney nickel catalyst at a temperature between 75° and 180° C. and a pressure of between 1500 and 7500 p.s.i. until an amount of hydrogen has been absorbed which corresponds roughly to reduction of the nitro and the carbonyl groups. The solvent is then removed by distillation. The solvent-free product of the hydrogenation is redissolved in aqueous sodium hydroxide and ruthenium dioxide is used to catalyze the second hydrogenation conducted under a temperature of 100–110° C. at 1500–2000 p.s.i. hydrogen pressure, until hydrogen consumption stops (about two hours). During the hydrogenation reactions, the carbonyl group, benzene ring and $NO_2$ groups are converted, respectively, to methylene, cyclohexane and amine groups. The ammonium, substituted ammonium, aliphatic and cycloaliphatic R groups are produced by neutralization or esterification of the acid, or ester interchange of the esters.

The product of the aforesaid reactions as well as the derivatives thereof, illustrated by the Formula 2, can be polymerized to a high softening polyamide having excellent thermostability by heating to a temperature between 150 and 400° C., during which polymerization reaction the water, or other volatile material, formed by the combining groups of the polymer is withdrawn.

The examples which follow illustrate preferred embodiments of the invention in which parts are by weight unless otherwise indicated:

I. PREPARATION OF INTERMEDIATES

A. Beta-benzoylpropionic acid

A stirred suspension of 40 lbs. of anhydrous aluminum chloride in 40 l. of benzene was heated to 50° C. and then 15 lbs. of succinic anhydride was added as rapidly as the evolution of hydrogen chloride would permit. After addition was complete, heating under reflux was continued for another two hours. The mixture was cooled and discharged onto a large excess of ice, water and concentrated hydrochloric acid. The mixture stood overnight and then the excess benzene was stripped off under vacuum. The solid product was filtered off, washed with water and then dissolved in aqueous ammonia. The basic solution was warmed, treated with charcoal and filtered. The filtrate was acidified with hydrochloric acid, the solid product filtered off and washed with water. After drying thoroughly in air the product melted at 111–114° C. and weighed about 30 lbs. This is above the theoretical yield, but the product is pure enough for subsequent use.

B. Beta-(3-nitrobenzoyl)propionic acid

Fuming nitric acid (90% HNO$_3$, specific gravity 1.5, 10 lbs./1.5 lbs. of keto-acid) was cooled to 0° with stirring. The beta-benzoylpropionic acid was added in many small portions with continued stirring at a rate designed to keep the temperature below 5–10° C. Stirring at the low temperature was continued for another two hours when the reaction mixture was poured into an excess of ice and water. The precipitated solid was filtered off, washed with water and then recrystallized from glacial acetic acid and water.

The yields from individual runs are tabulated below:

TABLE I

| Amount of Beta-Benzoyl Propionic Acid | Yield of Nitro Acid | | Melting Point, ° C. |
|---|---|---|---|
| | Weight | Percentage | |
| 670 g | 366 g | 44 | 164–167 |
| 670 g | 349 g | 42 | 161–164 |
| 670 g | 331 g | 39 | 161–164 |
| 670 g | 278 g | 33 | 162–167 |
| 670 g | 251 g | 30 | 159–164 |
| 700 g | 320 g | 37 | 162–166 |
| 9.0 lbs.[1] | 9.9 lbs | 50 | 164–165 |

[1] Weight of starting material is given as succinic anhydride and yield is for two steps of Friedel-Crafts acylation and nitration.

C. Gamma-(3-aminocyclohexyl)butyric acid

A mixture containing 25 g. of beta-(3-nitrobenzoyl)propionic acid in a 150 ml. of a solvent, such as methanol, ethanol, propanol, and higher monohydroxy aliphatic alcohols, was hydrogenated over 10 g. of Raney nickel at about 500 atm. and 130–135° C. (the pressure may range, however, between 50 and 1000 atms. and the temperature between 100 and 250° C.). The catalyst was then filtered off, the alcohol boiled off and the residue dissolved in 150 ml. of 3% aqueous sodium hydroxide (or any suitable alkali or alkaline earth hydroxide) and again reduced using 1–2 g. of ruthenium dioxide catalyst and hydrogen at 2000 p.s.i. and 100–110° C. Superatmospheric pressures above 10 atmospheres and temperatures between 75° C. and 150° C. may be used. The catalyst was then removed by filtration and the solution neutralized to pH–7 with hydrochloric acid. The neutral solution was treated with charcoal, boiled and filtered through "Celite." After the filtrate was well concentrated it was diluted with dioxane to precipitate the product, which is recrystallized from boiling water. Table II illustrates the effectiveness of this reaction.

TABLE II

| Amount of beta-(3-Nitrobenzoyl) Propionic Acid | Gamma-(3-Aminocyclohexyl) Butyric Acid | |
|---|---|---|
| | Weight, g. | Percentage |
| 400 g | 100 | 30 |
| 300 g | 100 | 40 |
| 300 g | 128 | 51 |
| 100 g | 31.9 | 38 |
| 100 g | 18.3 | 22 |
| 100 g | 26.7 | 32 |
| 100 g | 27.0 | 33 |
| 100 g | 32.0 | 39 |
| 100 g | 31.1 | 37 |
| 300 g | 82 | 33 |
| 400 g | 114 | 34 |
| 425 g | 116 | 33 |

II. PREPARATION OF POLY-GAMMA-(3-AMINO-CYCLOHEXYL)BUTYRIC ACID

Dry monomeric gamma-(3-amino-cyclohexyl)butyric acid is placed in a suitable receptacle, air and oxygen removed either by evacuation with an oil pump or by replacement with an inert gas. A vessel, thus charged, and under a slow, steady stream of nitrogen, is plunged into a bath of boiling vapors of hexachlorobenzene (B.P. 326° C.). The monomer melts very rapidly down to a thin fluid liquid which froths, loses water vapor and becomes thicker. After two hours, vacuum is applied and heating continued at the same temperature for another two hours. By this procedure polymers are obtained having these properties:

PROPERTIES OF POLY-GAMMA-(3-AMINOCYCLOHEXYL) BUTYRIC ACID

| A.S.T.M. | | |
|---|---|---|
| #D792-A | Density | 1.08 g./cc. |
| #D696-44[1] | Thermal Coefficient of Linear Expansion | 1.90–3.23×10$^{-5}$ in./in./° C. |
| #D150-47T | Dielectric Constant (1,000 c.p.s.) | 3.68. |
| #D790 | Flexural Modulus at 23° C | 4.32×10$^5$ p.s.i. |
| #D790 | Flexural Modulus at 150° C | 2.48×10$^5$ p.s.i. |
| #D790 | Flexural Strength | 16,300 p.s.i. |
| #D638 | Tensile strength | 10,200 p.s.i. |
| | with Elongation of | 7%. |
| | Stress Relaxation[2] | 82%. |
| | Inherent Viscosity, 0.5% solution in 70:30 mixture of phenol and 2,4,6-trichloro-phenol— $\eta_{inh} = \frac{\text{ln (relative viscosity)}}{\text{conc. in g/100 ml.}}$ | 0.9–1.2. |

[1] The values are at room temperature.
[2] Stress relaxation—82% retention after 63 hrs. at 73° F. at a strain of 0.00671 and at an initial stress of 2020 p.s.i. Sample is clamped in testing machine and elongated rapidly until a suitable strain is produced, the length is maintained constant and the force resulting from the deformation is measured at a series of times. The stresses produced in the specimen may be computed from these forces and the dimensions of the specimen.

Moreover, the polyamide is not affected in physical appearance by treatment with toluene, dioxane or chloroform, although methanol and acetone give film a slightly cloudy appearance.

Esters of gamma-(3-aminocyclohexyl)butyric acid can be made by esterification of the acid with methyl, ethyl, n- and isopropyl, n- and isobutyl, and the higher molecular weight alcohols. Alternatively, the esters may be made by ester interchange of the lower alkyl esters of the monomeric acid of the invention with higher molecular weight alcohols in the presence of a mild acid catalyst.

The polymers of the invention may be injection molded, extrusion molded or compression molded to give objects of any desired shape; or contrariwise, may be formed, by other suitable processes, into filaments, bristles, films, and the like by extrusion. Films and sheets can likewise be prepared from solution casting of the polymers.

The monomers of the invention may be copolymerized with other monomeric polymerizable compounds and particularly with mixtures of other polyfunctional amines and polybasic acids heretofore employed for preparing polyamides. These copolymers, accordingly, can be made by heating a monomer or a polymer of the invention with caprolactam, aminocarboxylic acids generally, with dibasic acid-hexamethylenediamine condensation products, and preferably those in which the polymer chain is relatively short. Moreover, the polymer produced by the process of the invention may be compounded with dyes, pigments, fillers and the like, in accord with the well known processes for similar treatment of nylon resins.

We claim:
1. A monomer having the structural formula:

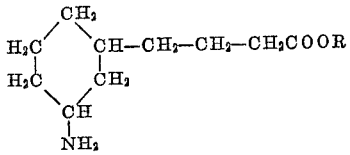

wherein R is of the group consisting of hydrogen, methyl, ethyl, n-, and isopropyl, and n-, and isobutyl groups, and polymerizable to a linear polymer having a high softening point, an excellent thermal stability and a low melt viscosity at molding temperature, that has the repeating structural unit:

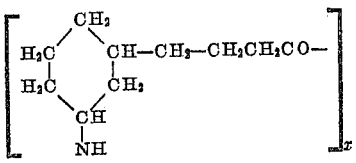

2. In a process for the prepartion of gamma-(3-aminocyclohexyl)butyric acid by the hydrogenation of a beta-(3-nitro-benzoyl)propionic acid, the steps which comprise hydrogenating beta-(3-nitro-benzoyl)propionic acid in the presence of a monohydric alcohol and a Raney nickel catalyst, at a temperature between 100 and 250° C. under pressures between 50 and 1,000 atmospheres, separating the catalysts and alcohol from the reaction product, neutralizing the resulting product with sodium hydroxide, and thereafter hydrogenating the neutralized product in the presence of ruthenium dioxide and at a temperature between 75 and 150° C. and at superatmospheric pressures.

References Cited in the file of this patent
UNITED STATES PATENTS

| | | |
|---|---|---|
| 2,071,253 | Carothers | Feb. 16, 1937 |
| 2,130,989 | Schemmelschmidt | Sept. 20, 1938 |
| 2,252,555 | Carothers | Aug. 12, 1941 |
| 2,662,915 | Loutz | Dec. 15, 1953 |

FOREIGN PATENTS

| | | |
|---|---|---|
| 82,441 | Germany | July 10, 1895 |
| 844,349 | Germany | July 21, 1952 |

OTHER REFERENCES

Feiser et al.: Organic Chemistry, 2nd edition (1950), pp. 580–81 and 634.

Barkdoll et al.: Chem. Abstracts, vol. 48 (1954), p. 2618.

UNITED STATES PATENT OFFICE
CERTIFICATE OF CORRECTION

Patent No. 2,894,025            July 7, 1959

Arthur William Anderson et al.

It is hereby certified that error appears in the printed specification of the above numbered patent requiring correction and that the said Letters Patent should read as corrected below.

Column 2, line 8, equation "3.", right-hand portion of the formula, for $-COOH_2CH_2COOH$ read $-COCH_2CH_2COOH$ column 5, claim 1, second formula, lower portion of the benzene ring, for

Signed and sealed this 1st day of December 1959.

(SEAL)
Attest:

KARL H. AXLINE            ROBERT C. WATSON
Attesting Officer            Commissioner of Patents